W. E. BARTON.
Lathe-Chucks for Sleigh-Bells.

No. 145,383.                          Patented Dec. 9, 1873.

WITNESSES:                                        INVENTOR:
Jas. L. Ewin                                     William E. Barton
Walter Allen                                      By Knight Bros Attorneys.

UNITED STATES PATENT OFFICE.

WILLIAM E. BARTON, OF EAST HAMPTON, CONNECTICUT.

IMPROVEMENT IN LATHE-CHUCKS FOR SLEIGH-BELLS.

Specification forming part of Letters Patent No. 145,383, dated December 9, 1873; application filed May 15, 1873.

*To all whom it may concern:*

Be it known that I, WM. E. BARTON, of East Hampton, in the county of Middlesex and State of Connecticut, have invented an Improvement in Lathe-Chucks for Turning, Re-Turning, and Burnishing Sleigh-Bells and other spherical objects, of which the following is a specification:

My improved chuck is formed with a concave face to securely seat a convex object, and an axial screw to hold the object to be turned. The said screw occupies a longitudinal aperture extending completely through the chuck, and made largest at its forward end to afford some degree of lateral play or spring to the point of the screw, and thus permit it to adapt itself to the object that it holds.

Figure 1:
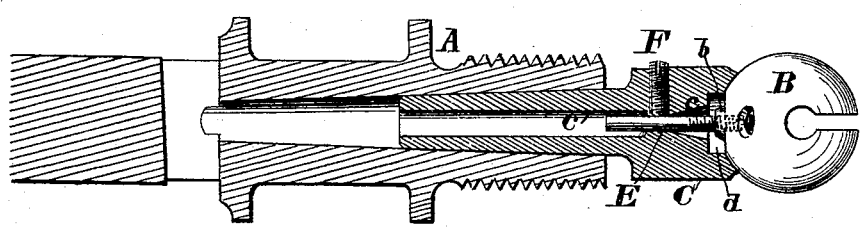
Figure 2:
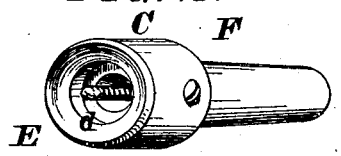

In the accompanying drawings, Figure 1 is an axial section of the head-stock of a lathe with a chuck, illustrating my invention, and showing, also, a sleigh-bell in position. Fig. 2 is a perspective view of the chuck detached.

My improved chuck may be used with a head-stock, A, of any usual or suitable form. B represents a sleigh-bell which is to be turned. The chuck C is formed with an axial opening, $c\ c'$, extending from end to end, the front of which aperture flares forward and terminates in a cavity or countersink, $d$, to afford room for the projecting boss $b$ on the sleigh-bell B. E is a screw-threaded rod, fixed in the opening $c$ by means of a set-screw, F, and adapted to hold the bell B by taking into the threaded orifice in the base thereof.

The rod E being set to any necessary degree of prominence and secured by the set-screw F, the bell or other object to be turned is screwed on the end of the rod, the latter springing or being deflected sufficiently to permit the convex surface of the object to fit and bear securely within the rim of the chuck at all points. It is thus securely held for turning or re-turning, or burnishing after plating.

My mode of chucking by the base only will be seen to constitute a much better mode for finishing sleigh-bells than the more usual way of centering by the base and top both, because where double chucks are used the bells have to be cast with an extra piece of metal in the center of the throat, which must be cut out after the bell is finished.

In the event of the screw-rod E breaking in the chuck, the opening $c\ c'$, extending completely through, admits of readily punching it out.

The following is claimed as new:

The lathe-chuck herein described, formed with a countersink or concavity in its end and a central screw, the whole adapted to hold a spherical or other convex object with a threaded aperture, in the manner explained.

W. E. BARTON.

Witnesses:
 OCTAVIUS KNIGHT,
 WALTER ALLEN.